US011202978B2

(12) United States Patent
Fell et al.

(10) Patent No.: US 11,202,978 B2
(45) Date of Patent: Dec. 21, 2021

(54) LINER FOR A FILTER SUB-ASSEMBLY

(71) Applicant: MANN+HUMMEL GmbH, Ludwigsburg (DE)

(72) Inventors: Anthony W. Fell, Yeovil (GB); Tiago Marques, Leca da Palmeira (PT); Angus Rouse, Leeds (GB); Vikas Jilakarapalli Prabhakar, Bangalore (IN); Robin Nash, Huntworth (GB); Prashanth Mari Ambanna, Marathalli (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 438 days.

(21) Appl. No.: 16/214,098

(22) Filed: Dec. 9, 2018

(65) Prior Publication Data

US 2019/0176063 A1    Jun. 13, 2019

(30) Foreign Application Priority Data

Dec. 8, 2017   (GB) ..................................... 1720491

(51) Int. Cl.
| | |
|---|---|
| *B01D 33/067* | (2006.01) |
| *B01D 33/11* | (2006.01) |
| *B04B 1/00* | (2006.01) |
| *B04B 5/00* | (2006.01) |
| *B01D 35/30* | (2006.01) |
| *F01M 11/03* | (2006.01) |

(52) U.S. Cl.
CPC ............ *B01D 33/067* (2013.01); *B01D 33/11* (2013.01); *B01D 35/30* (2013.01); *B04B 1/00* (2013.01); *B04B 5/005* (2013.01); *B01D 2201/0423* (2013.01); *F01M 11/03* (2013.01)

(58) Field of Classification Search
CPC ...... B01D 33/067; B01D 35/30; B01D 33/11; B01D 2201/0423; B01D 21/262; B04B 1/00; B04B 5/005; B04B 7/12; B04B 7/08; F01M 11/03; F01M 1/10; F01M 2001/1035
USPC ...................................... 494/44, 45
See application file for complete search history.

(56) References Cited

U.S. PATENT DOCUMENTS

| | | | |
|---|---|---|---|
| 4,157,966 A | 6/1979 | Hassall | |
| 4,439,177 A | 3/1984 | Conway | |
| 5,713,826 A | 2/1998 | West | |
| 6,458,067 B1 | 10/2002 | Dorin et al. | |
| 8,808,155 B2 | 8/2014 | Zonneveld et al. | |
| 10,940,663 B2 * | 3/2021 | Takemoto | B32B 1/02 |
| 2015/0291309 A1 * | 10/2015 | McGregor | A47J 33/00 |
| | | | 220/573.1 |

FOREIGN PATENT DOCUMENTS

| | | |
|---|---|---|
| CA | 980746 A | 12/1975 |
| CN | 205288730 U | 6/2016 |
| EP | 1212140 B1 | 6/2002 |
| EP | 2285464 A1 | 10/2009 |

(Continued)

*Primary Examiner* — Walter D. Griffin
*Assistant Examiner* — Shuyi S. Liu

(57) ABSTRACT

A liner for a filter sub-assembly has a wall having an innermost surface that bounds a cavity extending between opposing first and second ends of the liner. The wall has a deflected portion extending into the cavity and delimiting an opening. The liner may be used in a rotor of a filter assembly.

22 Claims, 2 Drawing Sheets

(56) References Cited

FOREIGN PATENT DOCUMENTS

| | | | |
|---|---|---|---|
| GB | 830527 | A | 3/1960 |
| GB | 2283694 | A | 5/1995 |
| GB | 2477791 | A | 8/2011 |
| WO | 2017041205 | A1 | 3/2017 |

* cited by examiner

LINER FOR A FILTER SUB-ASSEMBLY

BACKGROUND OF THE INVENTION

The invention relates to a liner for a filter sub-assembly. Filter assemblies are known for removing contaminant particles from lubricating oil circuits of internal combustion engines. They are also known for separating particulate matter from liquids, as well as separating liquids of different densities from one another, in a variety of industrial processes. Typically, a filter assembly comprises a housing having a rotor supported therein to spin about a spindle, the spindle providing an axis of rotation. A working fluid from which a contaminant is to be removed, e.g. engine oil, is supplied at elevated pressure along the axis of rotation to the rotor. Subsequently, the pressurized fluid is tangentially ejected from the rotor such that the rotor is caused to spin. As the working fluid flows through the spinning rotor, denser contaminants or particles are separated therefrom by centrifugal force and retained in the rotor, typically as a cake adhering to an interior surface of the rotor. Ejected fluid usually drains to a sump.

As retained contaminant particles agglomerate in the rotor, it is necessary to replace or service the rotor at suitably regular intervals to ensure the continued cleaning efficacy of the filter assembly. Insertable liners are often used to line the interior surface of the rotor, to aid cleaning in that contaminant particles become caked onto the insert, which is removable and disposable, instead of the interior surface. However, such liners may stick to the interior surface of the rotor, making their removal difficult and/or time consuming. Contaminant particles that do not form a cake on the liner may be left within the rotor upon removal of the liner. It may also be necessary to maintain a stock of the liners, which requires maintaining adequate storage space.

SUMMARY OF THE INVENTION

It is an object of the invention to at least reduce a problem associated with one or more known arrangements.

According to an aspect of the invention, there is provided a liner for a filter sub-assembly, the liner comprising: a wall having an innermost surface configured to bound a cavity extending between opposing first and second ends of the liner, the wall further having a deflected portion configured to extend into the cavity and delimit an opening. The liner may improve the ease of servicing and/or cleaning a filter assembly. The liner may reduce the total number of components of a filter assembly.

In certain embodiments, the deflected portion may provide a partially closed end of the liner. The wall may be formed as a monolithic tubular sleeve. The wall may be formed of or comprise a resiliently deformable material. The wall may be formed of or comprise silicone. The wall may be formed of or comprise a fiber reinforced polymer. The fiber reinforced polymer may include a first plurality of fibers oriented to extend circumferentially along the wall. Additionally, or alternatively, the fiber reinforced polymer may include a second plurality of fibers oriented to extend at least partially between the first and second ends.

Optionally, at least the deflected portion of the wall is substantially rigid. The wall may be rigid. The liner may comprise one or more stiffening members extending substantially perpendicularly from the deflected portion. The deflected portion of the wall may form an acute angle with the remainder of the wall.

The liner may comprise a first substantially rigid collar proximate the first end. The first substantially rigid collar may be encapsulated within the wall. The liner may comprise a second substantially rigid collar proximate the second end. The second substantially rigid collar may be encapsulated within the wall. The second substantially rigid collar may be encapsulated within the deflected portion of the wall.

In certain embodiments, the wall may have a first foldable region foldable to collapse the liner such that a first portion of the liner is receivable within a second portion of the liner. The first foldable region may have a stiffness that is less than a stiffness of the remainder of the wall. The liner may be tapered in that a width of the liner reduces between the first and second ends.

According to a further embodiment of the invention, there is provided a filter sub-assembly comprising: a rotary vessel having a rotor body and a closure member separably attachable the rotor body; and a liner as disclosed above, wherein the liner is receivable within the rotor body to line an inner surface thereof, the deflected portion in part delimiting first and second chambers of the rotor body and the opening fluidly connecting the first and second chambers to one another.

In certain embodiments, the closure member may be separably attachable to the rotor body by insertion of the closure member into an open end of the rotor body. The closure member may be sealable against the rotor body by the liner. The liner may be removable from the rotor body by separation, i.e. as a direct consequence of separation, of the closure member from the rotor body. The liner may comprise a retention member to facilitate separable attachment of the liner to the closure member.

According to a further aspect of the invention, there is provided a filter sub-assembly comprising: a rotary vessel having a rotor body and a closure member separably attachable to the rotor body; and a liner receivable within the rotor body to line an inner surface thereof, the liner being removable from the rotor body by separation of the closure member from the rotor body.

BRIEF DESCRIPTION OF THE DRAWINGS

Embodiments of the invention will now be described, by way of example only, with reference to the accompanying figures.

DESCRIPTION OF PREFERRED EMBODIMENTS

Figure 1:
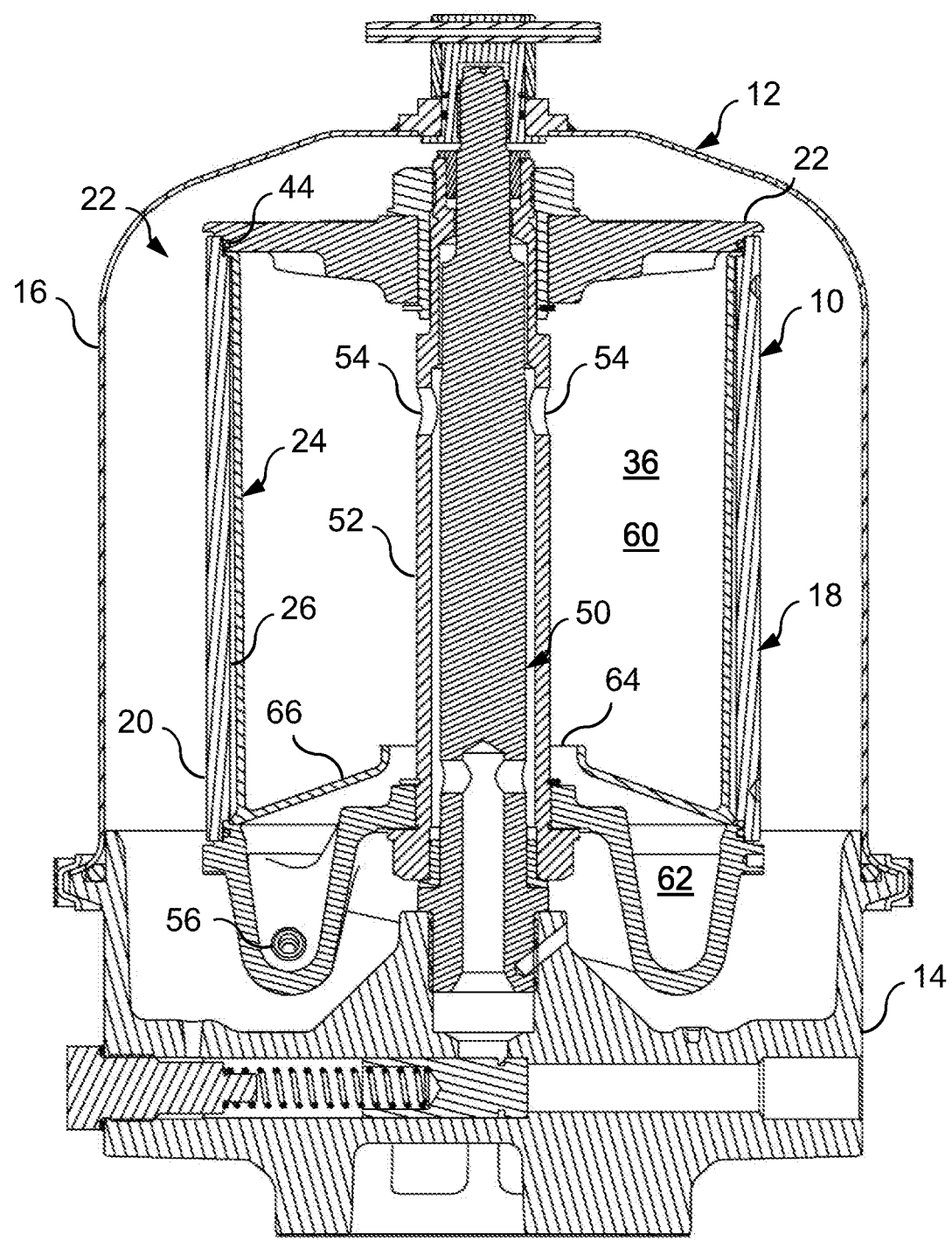
FIG. 1 is a cross-sectional view of a filter sub-assembly according to an embodiment of the invention, in which the sub-assembly is shown having a liner received in a rotor body.

FIG. 1 shows a filter sub-assembly 10 according to an embodiment of the invention. The sub-assembly 10 may have particular application in a motor vehicle, e.g. for cleaning engine oil in an engine lubrication system. However, other applications are contemplated, e.g. oil recovery. FIG. 1 shows the sub-assembly 10 supported within a housing 12. The housing 12 may have a base 14 and a cover 16. The sub-assembly 10 comprises a rotary vessel 18 having a rotor body 20 and closure member 22. The closure member is separably attachable to the rotor body 20. The sub-assembly 10 further comprises a liner 24 that is receivable within the rotor body 20 for lining an inner surface 26 thereof. The liner 24 may be receivable within the rotor body 20 through an open end 28 of the rotor body 20. As the skilled artisan will understand, the closure member 22 is separably attachable to the rotor body 20 to allow for insertion and/or removal of the liner 24 into/from the rotor body 20. The liner 24 may be re-usable or intended for single use.

Figure 2:
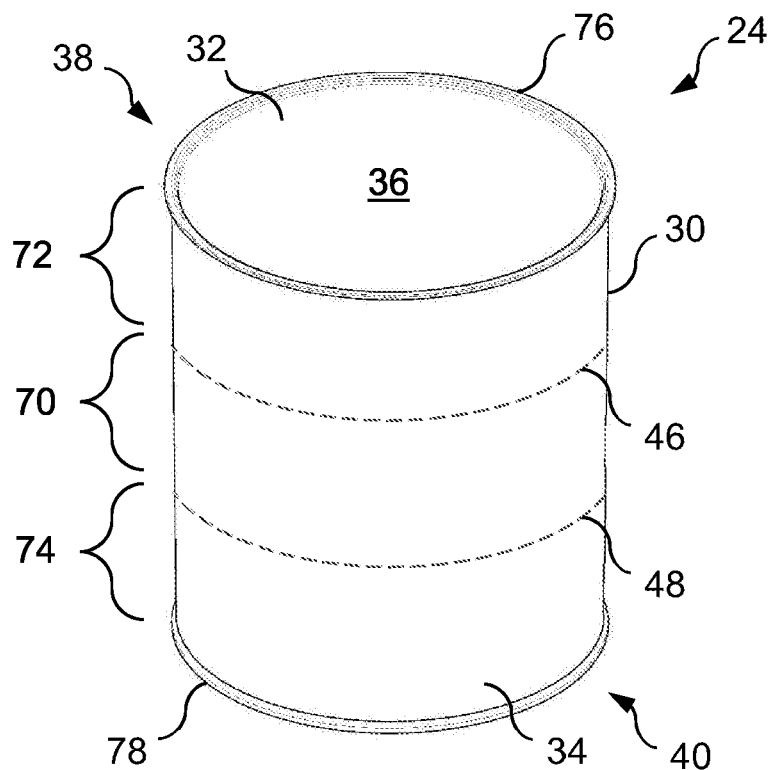
FIG. 2 is a perspective view of the liner of FIG. 1, in which the liner is shown in isolation and in an expanded state.

The liner 24 (best shown in FIGS. 2 and 3) comprises a wall 30 having an innermost surface 32 and an outermost surface 34. The innermost surface 32 is configured to bound, i.e. surround or delimit, a cavity 36 that extends between opposing first and second ends 38, 40 of the liner 24. Of course, in use, the cavity 36 is located within the rotor body 20. Each of the first and second ends 38, 40 may be substantially open ends of the liner 24. The wall 30 may have first and second foldable regions 46, 48, each of which are indicated in FIG. 2 by a respective broken line, extending along, e.g. circumferentially around, the wall 30. In certain embodiments, either or both of the first and second foldable regions 46, 48 may extend circumferentially continuously along the wall 30.

As shown in the illustrated embodiment, together, the first and second foldable regions 46, 48 may delimit first, second and third portions 70, 72, 74 of the liner 24. The first portion 70 of the liner 24 may extend between the first and second foldable portions 46, 48. The second portion 72 of the liner 24 may extend between the first foldable region 46 and the first end 38. The third portion 74 of the liner 24 may extend between the second foldable region 48 and the second end 40. However, the skilled artisan will understand that certain embodiments may have only a single foldable region, i.e. the first foldable region 46, delimiting only the first and second portions 70, 72 of the liner 24. Moreover, certain embodiments may have additional foldable regions and thus additional portions of the liner 24 extending therebetween.

In addition to the first and second foldable regions 46, 48, each of the first, second, and third portions 70, 72, 74 of the liner 24 may be provided by the wall 30. As such, the liner 24 may be a monolithic, i.e. one-piece, tubular sleeve, the wall 30 being continuous, e.g. circumferentially continuous.

Figure 3:
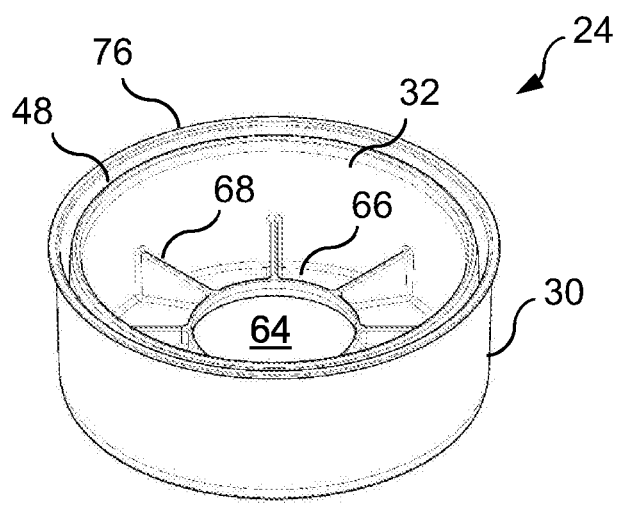
FIG. 3 is a perspective view of the liner of FIG. 1, in which the liner is shown in isolation and in a collapsed state.

Either or both of the first and second foldable regions 46, 48 are foldable to collapse the liner 24. FIG. 2 shows the liner 24 in an expanded state and FIG. 3 shows the liner 24 in a collapsed state. As shown in the illustrated embodiment, the liner 24 in the collapsed state may be substantially a third of a height of the liner 24 in the expanded state, e.g. in embodiments having both the first and second foldable regions 46, 48. In certain embodiments, the liner 24 in the collapsed state may be substantially half of the height of the liner 24 in the expanded state, e.g. in embodiments having only the first foldable region 46. The height of the liner 24 may be measurable in a direction extending between the first and second ends 38, 40.

Significantly, the first foldable region 46 may be foldable to allow the first portion 70 to be receivable, at least partially, within the second portion 72. To this end, the first foldable region 46 may have a stiffness that is less than a stiffness of the remainder of the wall 30. More specifically, the first foldable region 46 may have a stiffness that is less than a stiffness of either of the first and second portions 70, 72, respectively. Similarly, the second foldable region 48 may be foldable to allow the third portion 74 to be receivable, at least partially, within the first portion 70. To this end, the first foldable region 46 may have a stiffness that is less than a stiffness of the remainder of the wall 30. Moreover, the second foldable region 48 may have a stiffness that is less than a stiffness of either of the first and third portions 70, 74, respectively. Note that the stiffnesses of each of the first and second foldable regions 46, 48 may be substantially the same or may be different to one another. In certain embodiments, the second and/or third portion 72, 74 may be substantially rigid, i.e. non-flexible, as this may facilitate movement of the liner 24 between the collapsed and expanded states and/or improve the stability of the liner 24 in the expanded state. In essence, as the skilled artisan will understand, each of the first and second foldable regions 46, 48 may be more susceptible to folding than the remainder of the wall 30 to facilitate movement of the liner 24 between the expanded and collapsed states.

The liner 24 may be moveable between the expanded and collapsed states by opposing forces applied, e.g. by a user, to the first and second ends 38, 40, respectively. To collapse the liner 24, the opposing forces may act substantially toward one another. Conversely, to expand the liner 24, the opposing forces may act substantially away from one another.

The liner 24 may comprise a resiliently deformable, i.e. resilient or elastically deformable, material, e.g. silicone. However, other materials are contemplated, e.g. fiber reinforced polymers, in which fibers, may be oriented to extend circumferentially along the wall 30, i.e. parallel to the first and second ends 38, 40, to maximize a hoop strength of the wall 30 and/or at least partially between the first and second ends 38, 40, to increase an axial strength of the wall 30. In certain embodiments, the fibers may be oriented to extend at least substantially exclusively circumferentially along the wall 24. To form either or both of the first and second foldable regions 46, 48, the wall 30 may comprise one or more narrowed regions thereof. Thus, the first foldable region 46 may have a thickness that is less than a thickness of the remainder of the wall 30 and/or the second foldable region 48 may have a thickness that is less than the thickness of the remainder of the wall 30. Note that the thickness of each of the first and second foldable regions 46, 48 may be substantially the same or may be different to one another.

The liner 24 may comprise a substantially rigid first collar 76 extending about the wall 30 proximate the first end 38. In certain embodiments, the first collar 76 may be encapsulated in the wall 30. Similarly, the liner 24 may comprise a substantially rigid second collar 78 extending about the wall 30 proximate the second end 40. Either or both of the first and second collars 76, 78 may facilitate movement of the liner 24 between the collapsed and expanded states and/or improve the stability of the liner 24 in the expanded state. In certain embodiments, either or both of the first and second collars 76, 78 may be encapsulated in the wall 30, e.g. by being overmoulded, or be otherwise coupled, attached or integral to the wall 30.

The liner 24 may be separably attachable to closure member 22. Thus, in certain embodiments, the wall 30 may comprise an edge margin 42 proximate the first end 38 configured to separably attach the liner 24 to the closure member 22. To this end, the edge margin 42 may comprise a retention member (not shown) proximate the first end 38. In certain embodiments, the liner 24 may be stretchable over the closure member 22 such that separation of the closure member 22 from the liner 24 may be inhibited by an inherent resilience of the liner 24 exerting a gripping force, e.g. a radially inward force, acting on the periphery of the closure member 22. The edge margin 42 may have a thickness that is greater than a thickness of the remainder the wall 30. In certain embodiments, the edge margin 42 and/or the closure member 22 may be otherwise separably attachable to one another, e.g. the edge margin 42 and the closure member 22 may comprise complementary portions of a plurality of snap fasteners (not shown). Indeed, the skilled artisan will understand that the edge margin 42 may comprise any suitable retention member to effect separable attachment of the liner 24 to the closure member 22. The separable attachment of the liner 24 to the closure member 22 may facilitate the removal of the liner from within the rotor body 20, as the liner 24 may be removable from within the rotor body 20 by separation of the closure member 22 from the rotor body 20.

The liner 24 may be tapered. More specifically, the liner 24 may be tapered in that a width of the liner 24 reduces between the first and the second ends 38, 40. The width may be measurable between opposing, e.g. diametrically opposing, points of the outermost surface 34 at intervals extending between the first and second ends 38, 40. In certain embodiments, the width may reduce substantially linearly. In certain embodiments, the width may differ between each of the portions 70, 72, 74 of the liner 24. As such, the first portion 70 may have a width that is less than a width of the second portion 72. The third 74 portion may have a width that is less than the width of the first portion 70.

As shown in the illustrated embodiment, the closure member 22 may be separably attachable to the rotor body 20 by insertion of the closure member 22 into the open end 28 of the rotor body 20. Additionally, or alternatively, the closure member 22 may be frictionally engageable with the open end 28 to inhibit separation of the closure member 22 from the rotor body 20, i.e. the closure member 22 may achieve a friction fit with the open end 28. The closure member 22 may be fluidly sealable against the rotor body 20 by a resilient seal 44 extending along an outer periphery of the closure member 22. Thus, together, the rotor body 20 and the closure member 22 may form a sealable volume. In certain embodiments, the resilient seal 44 may be a conventional elastomeric O-ring seal. However, in certain embodiments, the liner 24 may fluidly seal the closure member 22 against the rotor body 20, in the absence of the resilient seal 44 or together therewith. The liner 24 may fluid-tightly seal the closure member 22 against the rotor body 20 in that the liner 24 may be capturable between the closure member 22 and the rotor body 20. As such, the liner 24 may be compressible to fluid-tightly seal the closure member 22 against the rotor body 20. By using the liner 24 to fluid-tightly seal the closure member 22 against the rotor body 20, a sealing arrangement may be provided that may be more reliably cleaned at service intervals.

As is conventional, the sub-assembly 10 may further comprise a fluid supply duct 50 extending through the rotor body 20 to supply the rotor body 20 with a working fluid, i.e. a fluid to cleaned/filtered. The working fluid may be engine oil. As shown in the illustrated embodiment, the fluid supply duct 50 may be a bore formed in a bearing tube 52. The bearing tube 52 may be mountable upon a spindle, about which the rotary vessel 18 is rotatable. The rotor body 20 may be fluidly connectable to the fluid supply duct 50 by one or more through bores 54 provided in the bearing tube 52. In use, the working fluid may be supplied to the supply duct 50 at elevated pressure to flow from the through bores 54 into the rotor body 16 and thus into the cavity 36.

The rotary vessel 18 may be self-powerable, i.e. a pressurised supply of working fluid to the rotor body 20 may drive rotation of the rotary vessel 18. To this end, the rotor body 20 may comprise a pair of diametrically opposed nozzles 56 at a radial distance from the bearing tube 52 (only one of the nozzles 56 is visible in the cross-sectional view shown in FIG. 1). As the skilled artisan will understand, other configurations of the nozzles 56 may be possible, e.g. the rotor body 20 may comprise three or more of the nozzles 56. Each of the nozzles 56 being configured to eject working fluid from the rotor body 20 in a direction generally tangential to the rotor body 20. As the skilled artisan will understand, the tangential emission of pressurized working fluid generates a reactive force that may cause rotation of the rotor body 20 relative to the base 14, upon which the bearing tube 52 may be mountable.

In use, as working fluid flows through the rotor body 20, and thus through the cavity 36, centrifugal force causes separation of contaminant material within the working fluid. Separated contaminant material may accumulate within the cavity 36, primarily as a cake adhering to the innermost surface 32 of the liner 24. Fluid exiting the rotor body 20, through the nozzles 56, may drain to a sump. As contaminant accumulates within the cavity 36, i.e. within the liner 24, the rotary vessel 18 must be serviced to empty the liner 24 of the accumulated separated contaminant particulate matter. The frequency of servicing will vary depending on the embodiment, the operating environment and the number of operating hours. To service the rotary vessel 18, the closure member 22 is separated from the rotor body 20. In certain embodiments, separation of the closure member 22 from the rotor body 20 will expose the liner 24 within the rotor body 20. Consequently, the liner 24 is removable from the rotor body 20, along with the separated contaminant particulate matter contained therein. Alternatively, as described above, the liner 24 may be removable from within the rotor body 20 by separation of the closure member 22 from the rotor body 20. The liner 24 may be washed or otherwise suitably cleaned, before returning the liner 24 to the rotor body 20. Flexion of the liner 24 may facilitate the removal of separated contaminant particulate adhered to the innermost surface 32.

The wall 30 may comprise a deflected portion 66 configured to extend into the cavity 36. Consequently, as shown in the illustrated embodiment, the liner 24 may be receivable within the rotor body 20 such that the deflected portion 66 may in part delimit upper ("first") and lower ("second") chambers 60, 62 of the rotor body 20, the upper and lower chambers 60, 62 being on opposing sides of the deflected portion 66. The deflected portion 66 may delimit an opening 64 through which the upper and lower chambers 60, 62 are fluidly connectable to one another. As such, in certain embodiments, the deflected portion 66 may provide a partially closed end of the liner, i.e. the second end 40 may be a partially closed end. In certain embodiments, the deflected portion 66 may be provided between the first and second ends 38, 40.

In use, the working fluid may flow into the upper chamber 60, before flowing through the opening 64 downwardly, into the lower chamber 62. The opening 64 may surround the bearing tube 52. The deflected portion 66 may serve to direct flow of the working fluid within the upper chamber 60 from a downward direction adjacent the innermost surface 32 back upward and towards the opening 64. To this end, the deflected portion 66 may extend into the cavity 36 at an acute angle relative to the remainder of the wall 30. Thus, as shown in the illustrated embodiment, the deflected portion 66 of the wall 30 may be frustoconical. The deflected portion may slow the rate of flow of the working fluid within the rotor body 20 to enhance separation of particulate matter and/or may inhibit accumulated particulate matter from descending into the lower chamber 62 to potentially clog, i.e. block, the nozzles 56.

In certain embodiments, the deflected portion 66 may be substantially rigid. Thus, the second collar 78 may extend into the cavity, coupled to or encapsulated within the deflected portion 66. Additionally, or alternatively, the liner 24 may comprise one or more stiffening members 68, e.g. stiffening ribs, to improve the stability and/or rigidity of the deflected portion 66. To this end, each of the one or more stiffening members 68 may extend substantially perpendicularly away from the deflected portion 66. The one or more stiffening members 68 may be formed integrally with the wall 30. The deflected portion 66 may provide a substantially rigid base of the liner 24, as this may facilitate movement of the liner 24 between the collapsed and expanded states and/or improve the stability of the liner 24 in the expanded state.

The deflected portion 66 may replace, i.e. substitute, a divider (not shown), which the skilled artisan will understand may be termed a "separation cone". The divider, a conventional part of known filter assemblies, typically in part delimits the upper and lower chambers 60, 62. However, in certain embodiments the deflected portion 66 may line the divider, in addition to lining the inner surface 26 of the rotor body 20.

The invention is not restricted to the details of any foregoing embodiments. The invention extends to any novel one, or any novel combination, of the features disclosed in this specification (including the accompanying claims and drawings) or to any novel one, or any novel combination, of the steps of any method or process so disclosed. The claims should not be construed to cover merely the foregoing embodiments, but also any embodiments which fall within the scope of the claims.

All of the features disclosed in this specification (including the accompanying claims and drawings) and/or all of the steps of any method or process so disclosed, may be combined in any combination, except combinations where at least some of such features and/or steps are mutually exclusive.

Each feature disclosed in this specification (including the accompanying claims and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A liner for a filter sub-assembly, the liner comprising:
a wall formed as a tubular sleeve surrounding a central axis, the wall comprising
an innermost surface configured to bound a cavity extending between a first axial end of the liner and an opposing second axial end of the liner;
the wall further comprising
a deflected portion configured to extend into the cavity and to delimit an opening;
wherein the deflected portion of the wall includes one or more stiffening ribs arranged on the deflection portion of the wall, the stiffening ribs projecting axially outwardly away from the deflected portion of the wall, the stiffening ribs increasing the stability and rigidity of the deflected portion;
wherein the deflected portion provides a partially closed end of the liner.

2. The liner according to claim 1, wherein
the wall is formed as a monolithic tubular sleeve.

3. The liner according to claim 1, wherein
the wall is formed of or comprises a fiber reinforced polymer;
wherein the fiber reinforced polymer includes
a first plurality of fibers oriented to extend circumferentially along the wall;
a second plurality of fibers oriented to extend at least partially between the first and second axial ends of the liner.

4. The liner according to claim 1, wherein
the deflected portion of the wall forms an acute angle with a remainder of the wall.

5. The liner according to claim 1, further comprising
a first rigid collar proximate the first axial end of the liner.

6. The liner according to claim 5, wherein
the first rigid collar is overmoulded onto or encapsulated within the wall.

7. The liner according to claim 1, wherein the liner is tapered such that a width of the liner reduces between the first and second ends of the liner.

8. The liner according to claim 1, wherein
the wall is formed of or comprises silicone.

9. A liner for a filter sub-assembly, the liner comprising:
a wall formed as a tubular sleeve surrounding a central axis, the wall comprising
an innermost surface configured to bound a cavity extending between a first axial end of the liner and an opposing second axial end of the liner;
the wall further comprising
a deflected portion configured to extend into the cavity and to delimit an opening;
further comprising:
a first rigid collar proximate the first axial end of the liner;
a second rigid collar proximate the second axial end of the liner;
wherein the deflected portion provides a partially closed end of the liner.

10. The liner according to claim 9, wherein
the wall is formed of or comprises silicone.

11. The liner according to claim 9, wherein
the second rigid collar is overmoulded onto or encapsulated within the wall.

12. The liner according to claim 11, wherein
the second rigid collar is overmoulded onto or encapsulated within the deflected portion of the wall.

13. The liner according to claim 9, wherein
the wall comprises a foldable region configured to fold so as to collapse the liner such that a first portion of the liner is receivable within a second portion of the liner;
wherein the foldable region has a stiffness that is less than a stiffness of a remainder of the wall.

14. The liner according to claim 9, wherein
the first rigid collar is overmoulded onto or encapsulated within the wall.

15. The liner according to claim 14, further comprising
a second rigid collar proximate the second axial end of the liner.

16. The liner according to claim 15, wherein
the second rigid collar is overmoulded onto or encapsulated within the wall.

17. The liner according to claim 9, wherein
the wall comprises a foldable region configured to fold so as to collapse the liner such that a first portion of the liner is receivable within a second portion of the liner;

wherein the foldable region has a stiffness that is less than a stiffness of a remainder of the wall.

18. The liner according to claim 9, wherein
the wall is formed of or comprises a fiber reinforced polymer;
wherein the fiber reinforced polymer includes
   a first plurality of fibers oriented to extend circumferentially along the wall;
   a second plurality of fibers oriented to extend at least partially between the first and second axial ends of the liner.

19. A filter sub-assembly comprising:
a rotary vessel comprising
   a rotor body and
   a closure member separably attachable to the rotor body; and
a liner according to one of claim 1 or 9, the liner, wherein
   the wall comprises an innermost surface configured to bound a cavity extending between the first axial end of the liner and the second end of the liner,
   wherein the deflected portion delimits an opening;
   wherein the liner is receivable within the rotor body to line an inner surface of the rotor body;
   wherein the rotor body comprises
      a first chamber and
      a second chamber;
   wherein the deflected portion of the liner in part delimits the first and second chambers of the rotor body and the opening fluidly connects the first and second chambers to one another.

20. The filter assembly according to claim 19, wherein
the closure member is separably attachable to the rotor body by insertion of the closure member into an open end of the rotor body.

21. The filter assembly according to claim 19, wherein
the closure member is sealable against the rotor body by the liner.

22. The filter assembly according to claim 19, wherein
the liner is removable from the rotor body by separation of the closure member from the rotor body.

* * * * *